E. OLDFIELD.
BALL BEARING.
APPLICATION FILED NOV. 17, 1913.
1,179,135.
Patented Apr. 11, 1916.
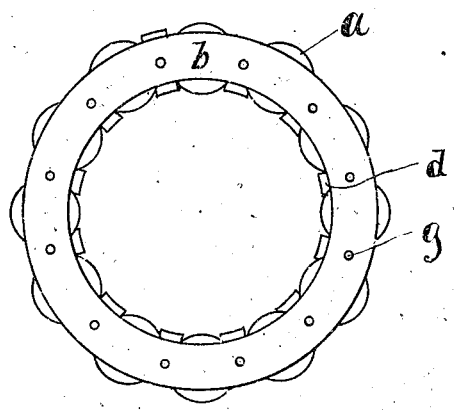
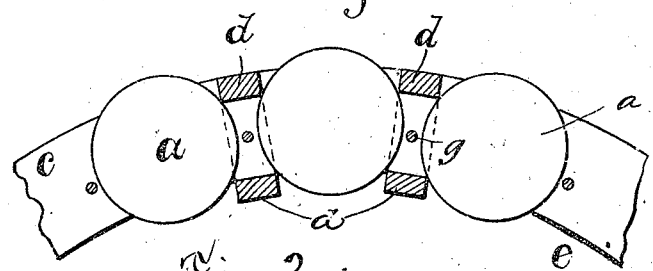
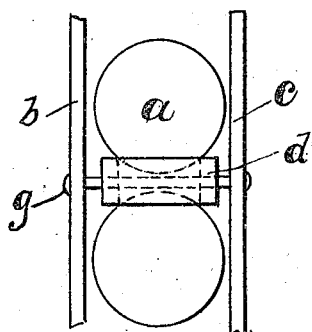 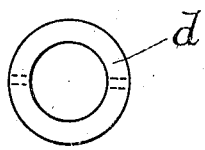
WITNESSES:
Elsie P. Grunert
Blanche L. Chartier
INVENTOR
Edwin Oldfield
BY Frank H. Allen
ATTORNEY

UNITED STATES PATENT OFFICE.

EDWIN OLDFIELD, OF NORWICH, CONNECTICUT.

BALL-BEARING.

1,179,135.  Specification of Letters Patent.  Patented Apr. 11, 1916.

Application filed November 17, 1913. Serial No. 801,330.

*To all whom it may concern:*

Be it known that I, EDWIN OLDFIELD, a citizen of the United States, residing at Norwich, in the county of New London and State of Connecticut, have invented a certain new and useful Improvement in Ball-Bearings, of which the following is a specification, reference being had to the accompanying drawings.

This invention has for its particular object the improvement of that type of ball bearings in which the balls are suitably spaced apart by so-called "separators" which latter are located with respect to the said balls by means of a cage formed of rings or plates between which the said separators are mounted.

Briefly described, my said improvement consists of washer-like separators, interposed between the balls, each of said separators being hung centrally, and loosely on the pins or rivets that connect the said rings or plates in such manner that each separator is free to adjust itself to the varying positions assumed by the balls on either side of said separator.

My improvement is clearly illustrated by the annexed drawings, Figure 1 being a side view of a cage, having separators mounted therein, by my present improved means. Fig. 2 is a relatively enlarged view of a portion of one of the cage rings having assembled thereon, three balls and two separators. Fig. 3 is an outer edge view of the portions of the two cage rings with two balls, and an interposed separator, mounted between said rings. Fig. 4 is a view of one of the said separators.

Referring to these drawings, the letter *a* indicates a plurality of balls, located between two opposing rings *b* and *c*, said balls being suitably spaced apart by washer-like separators *d*; the balls and separators being arranged in such close relation to each other that portions of each ball lie within the opening of the adjacent separators and so that, when the described elementary parts are assembled, and the two ring members are clamped together, a cage-like structure is provided which may be used between the concentric outer and inner raceways of ball bearings of the type now commonly used. The said separators, or certain of them, are drilled diametrically, as at *e*, to receive rivets, or screws, *g* which serve, not only to space apart and clamp the two ring members *b—c*, together, but more particularly to support the separators pivotally, so that they may rock freely upon said pivots and thus adjust themselves to any deflection, or tendency to disarrangement on the part of the balls; especially when the complete ball bearing structure is operating under heavy loads, thus overcoming in a large degree any frictional resistance due to the rolling contact of the balls with the said separators.

So far as I am familiar with this type of ball bearings, it has been more or less common to provide separators (for the balls) that are either non-pivotally mounted between opposing rings (to which rings the said separators are rigidly secured) or in other instances the separators have been loosely located between the balls; the opposing ring members being in some cases dispensed with. In the rigidly secured type of separators an objectionable degree of friction results from the deflection of the balls when under a load and, in the loosely mounted type of separators, there is a tendency on the part of said separators to cramp and bind between the two adjacent balls.

In my present improved form of separators the said separators rock on their respective pivots, to follow any deflection, or disarrangement, of the balls but are at all times, suitably spaced apart, so that the balls always have sufficient clear space in which to rotate. My described construction also provides a cage-like structure that is complete in itself and is not dependent upon the outer raceway to prevent the escape of the balls radially, in other words, the balls are retained in their respective positions between the side rings by the over-lapping separators. By thus pivoting the separators on the rivets which connect the two ring members, each ball is located in a housing of its own (between two of the separators) so that, in the event that a ball is crushed or otherwise broken, it is prevented, in a large degree, from contacting with, and breaking the other balls, but the greatest advantage derived from my improved manner of pivotally locating and supporting the separators is in the fact, already clearly set forth, that the said separators are free to rock on their pivots and thus adjust themselves to any deflection of the balls.

Having thus described my invention I claim as new and wish to secure by Letters Patent:—

In a ball bearing, the combination of a circular series of load supporting balls, a pair of parallel rings arranged on opposite sides of the series of balls and out of contact therewith, a pivot member connecting said rings directly between the centers of each two adjacent balls, all of said pivot members serving to maintain the rings in proper spaced relation to each other and the balls, and a ring-shaped spacing member in the form of a short hollow cylinder pivoted diametrically upon each of said pivot members, the pair of balls on opposite sides of each separator member extending well into the open ends of the cylindrical separator close to said pivot member whereby a practically full complement of balls closely spaced from each other may be utilized.

EDWIN OLDFIELD.

Witnesses:
FRANK H. ALLEN,
ELSIE P. GRUNERT.